Nov. 11, 1941. L. J. NEVRAUMONT Re. 21,944

ROTARY CUTTER

Original Filed May 15, 1936

INVENTOR

L. J. Nevraumont

BY [signature] ATTORNEY

Reissued Nov. 11, 1941 Re. 21,944

UNITED STATES PATENT OFFICE 21,944

ROTARY CUTTER

Louis J. Nevraumont, Modesto, Calif., assignor to Bert G. Cochrane, Chicago, Ill.

Original No. 2,119,683, dated June 7, 1938, Serial No. 79,875, May 15, 1936. Application for reissue April 18, 1939, Serial No. 268,611

16 Claims. (Cl. 30—43)

This invention relates to a rotary cutter, my principal object being to provide a cutter of this character comprising stationary and rotary toothed cutting discs mounted and cooperating in such a manner that the implement when made in proper size will be very efficient for shaving purposes, as well as for hair clipping, sheep shearing, mowing and numerous other uses. The cutter is arranged so that it is self-sharpening and it may have a safety feature incorporated therewith to prevent possibly cutting the face or other part from which the material being cut projects.

The cutter has long wearing qualities so that the expense of blade replacement is practically eliminated. At the same time I have mounted the cooperating cutting discs so that either one may be easily and quickly replaced, if necessary.

Also this cutting device, because of the nature of its construction, permits cutting or shaving to occur at, or flush with, the surface to be shaven.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
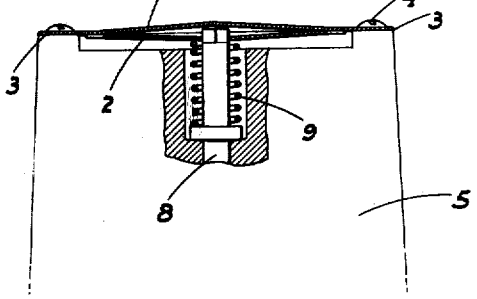
Fig. 1 is a sectional elevation of one form of my improved rotary cutter mounted for shaving purposes or as a razor in connection with a supporting body and handle unit.
Figure 2:
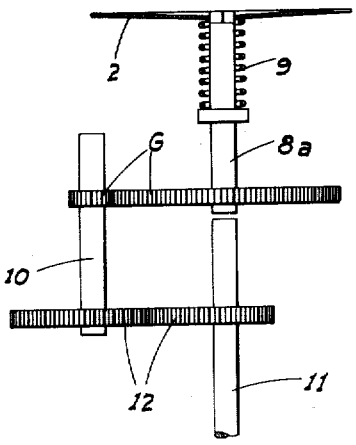
Fig. 2 is a diagrammatic elevation showing a varying speed drive for the rotary cutting disc.

Referring now more particularly to the characters of reference on the drawing, and particularly at present to the type of cutter shown in Figs. 1 to 5, the cutter comprises a stationary cutting disc 1 disposed directly above the rotary cutting disc 2. The stationary disc is provided with opposed ears 3 adapted to be secured by screws 4 or the like on top of a relatively narrow supporting body and handle member 5, with clearance under the ears for the rotary disc. This member may be of the same general form and size, and have cutter drive means therein, as is the case with certain standard forms of self-contained or so-called mechanical razors now on the market.

Between the ears the stationary disc is provided about its periphery with notches forming teeth therebetween. These teeth may be of various forms, such as those having substantially parallel sides either disposed radial to the disc as shown at 6 in Fig. 3; at right angles to a diametral line projecting through the ears, as shown at 6a in Fig. 4; or the teeth may be of V or saw tooth form as shown at 6b in Fig. 5. The rotary disc is provided all about its periphery with teeth 7 shaped and arranged corresponding to the teeth on the cooperating stationary disc. The cooperating discs are adapted to engage each other closely about and for the radial extent of the teeth, being, however, relieved or concave relative to each other inwardly of the teeth, as shown, so as to reduce the area of frictional contact.

The rotary disc is slidably and removably but non-turnably mounted on the upper non-circular end of an axial shaft 8 depending therefrom and having a light compression spring 9 thereon constantly but yieldably pressing the rotary disc against the fixed stationary disc. The shaft 8 may be directly driven at a constant speed by an electric motor mounted within the body 5, as is the case with the previously mentioned standard mechanical razor; by means of a motor driven flexible shaft, such as is used in the dental profession, or by any other suitable means, depending of course on the type of service to which the cutter is to be put. I have, however, determined that for shaving purposes any speed between 70 and 1600 R. P. M. may be efficiently used.

For certain classes of work, it may be found that a varying rather than a constant disc speed will give better results. The cutter shaft 8a may therefore be gear connected to a countershaft 10, which in turn is connected to the actual drive shaft 11 by elliptic or variable speed gearing 12 of common character. With this arrangement of course the rotary disc alternately slows down and speeds up at evenly recurring intervals with the constant speed of the shaft 11. With this arrangement it is desirable that the rotary disc shall have a certain number of these slowing down and speeding up movements with each revolution. Hence, the gearing G between the shaft 8a and the counter-shaft 10 is arranged to reduce the speed of the disc considerably from that of said shaft 10.

The above form of cutter is of the plain or unguarded type and since opposed portions of the rotary disc on the opposite side of the body of course project clear of the same, it is possible for the user to cut himself if the device is being used as a razor. This possibility may, however, be eliminated by the construction shown in Figs. 6 to 8. In the form shown in Fig. 6 the rotary disc 2 is of the same form as already described, but the stationary disc 1a has a guard skirt 13 depending about the same at right angles thereto and of course enclosing the rotary disc. The stationary disc teeth are formed by closed-end slots 14 extending part way down the skirt and on top of the same for the radial extent of the rotary disc teeth. In the type shown in Fig. 7 the skirt 13a is disposed at an obtuse angle or at a flare relative to the stationary disc 1b. The rotary cutter disc 2a is relatively thick; the peripheral and upper edges of the teeth in said disc engaging closely against the inner surface of the stationary disc and its skirt.

Figure 3:
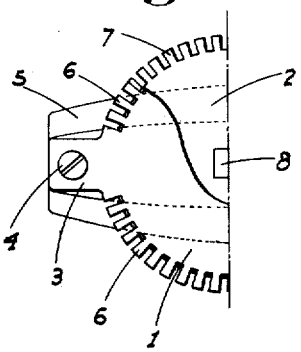
Figs. 3 to 5 are fragmentary plan views of the cutter showing different forms of cutting teeth.
Figure 4:
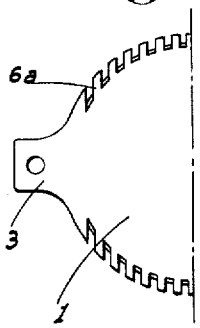
Figure 5:
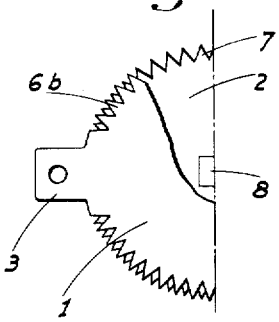
Figure 8:
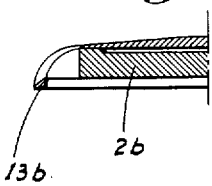

In the form shown in Fig. 8 the guard skirt 13b is curved and the outer edges of the teeth of the rotary disc 2b are similarly curved to engage the inner face of the curved skirt, as shown. In the last two forms of the cutter the spring 9 may be omitted, since a spring pressure on the rotary disc of this form would tend to cause the same to bind. In any case, the teeth both in the rotary cutting disc and in the guard skirt may be of the general form and arrangement as shown in Figs. 3 to 5 previously described.

Figure 6:
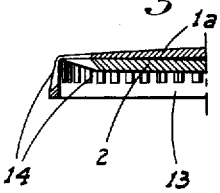
Figs. 6 to 8 are fragmentary enlarged radial sections showing various forms of safety or guard constructions.
Figure 7:
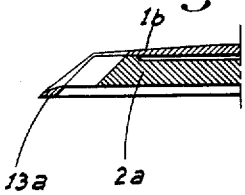

The stationary disc, as shown in Figs. 6 to 8, is progressively thickened from the peripheral margin toward the center, and is provided with a central portion which is substantially thicker than the slotted marginal portion.

The general form of cutter of any of the types herein disclosed will be found very efficient for shaving, as well as any other purpose for which it may be used, since the round peripheral edge of the stationary disc enables the same to closely engage and follow not only flat and convex surfaces, but get into hollows as well, and which a straight bladed implement is apt to partially bridge and skip.

It is here to be noted that in the attached drawing, the size of the cutter as shown is approximately twice as great as it would be actually made if used as a razor. For various other purposes, however, the cutter would be even larger than here shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A cutter comprising a stationary disc, a rotary disc cooperating therewith, and cooperating teeth about the periphery of the discs and varying-speed drive means connected to the rotary disc arranged to automatically give constantly recurring relatively fast and slow periods of rotation bearing a fixed ratio to each other.

2. A cutter comprising a stationary disc, a rotary disc cooperating therewith, and cooperating teeth about the periphery of the discs, a drive shaft adapted to be rotated at a constant speed, and connections between said shaft and the rotary disc to drive the latter at varying recurring speeds with each single revolution of said disc.

3. A cutter comprising a stationary disc, a rotary disc cooperating therewith and disposed under the same, cooperating teeth about the periphery of the discs and a guard skirt depending from the stationary disc outwardly of the rotary disc; said skirt having slots merging with the spaces between the teeth of the stationary disc, said slots terminating short of the outer edge of the skirt.

4. A cutter comprising a stationary disc, a rotary disc cooperating therewith and disposed under the same, teeth about the periphery of the rotary disc, said rotary disc being relatively thick and the teeth extending from top to bottom thereof, a skirt depending from the stationary disc and closely engaging the edge of the rotary disc from top to bottom, and teeth about the stationary disc to cooperate with the rotary disc and defined by slots cut through the skirt and the adjacent portion of the stationary disc.

5. A device as in claim 4 in which the skirt flares outwardly from the stationary disc, the rotary disc having a complementary skirt engaging surface.

6. A cutter comprising a stationary disc; a rotary cutter member cooperating therewith and disposed under the same; cooperating teeth about the periphery of the disc and the cutter member; and a guard skirt depending from the stationary disc outwardly of the cutter member, said skirt having slots merging with the spaces between the teeth of the stationary disc, said slots extending below said cutter member and terminating short of the outer edge of the skirt.

7. In a shaving device, the combination of a stationary apertured disc; a rotary cutter having at least one shearing edge engaging the undersurface of said disc to sever hairs projecting through the apertures thereof; and a guard wall receding from said stationary disk and surrounding said rotary cutter, said wall having a series of slots formed therein merging with the apertures in said stationary disc and guiding hairs thereto.

8. The invention as defined in claim 7, in which the rotary cutter has a shearing edge engaging the inside of the receding wall and cooperating with the edges formed by the slots therein to shear off long hairs extending through said slots.

9. The invention as defined in claim 7, in which the wall forms an obtuse angle with the disc, and in which the rotary cutter has a shearing edge engaging the inside of the receding wall and cooperating with the edges formed by the slots therein to shear off long hairs extending through said slots.

10. The invention as defined in claim 7, in which the wall forms substantially a right angle with the disc and the peripheral edge of the rotary cutter is spaced inwardly of the junction of the disc with said wall.

11. A shaving device comprising a stationary disc having a series of substantially radial narrow and closely spaced hair-receiving slots extending therethrough at the periphery thereof; a rotary cutter member having shearing surfaces cooperating with the underedges of the slotted portion of said disc to shear off hair extending therethrough; and a guard wall receding from said disc and surrounding said rotary cutter, said wall having a series of slots merging with the slots of the disc for guiding hair through the same and into the slots of the disc to be sheared off by said shearing edges, said last-named slots extending substantially below said shearing edges to allow long hair to pass therethrough and be sheared off by said edges.

12. In a shaving device having a rotatable inner cutter, an outer shear plate comprising a face-engaging disc having an annular series of narrow and closely spaced hair-receiving slots therethrough; and an annular receding guard flange integral with the disc provided with slots merging with the slots in the disc.

13. In a shaving device, the combination of a flat face engaging apertured shear plate; a rotatable cutter member having shearing edges in contact with the undersurface of said shear plate for shearing off hair extending therethrough; a casing; and flange means carried by and extending outwardly from said shear plate on opposite sides thereof for securing the same to said casing.

14. A shaving implement of the rotary type comprising a casing; a guard member having a substantially flat circular portion with a depending peripheral wall, said flat circular portion having openings forming approximately radial teeth therein, said wall having slots extending at right angles to the plane of said teeth and merging with the openings formed in said flat circular portion; an outwardly extending flange carried by said guard member for attaching the same to said casing; and a cutter having a plurality of blades rotatable in contact with the inner face of the guard.

15. In a shaving device, the combination of a thin, apertured skin-contacting shear plate; a rotatable blade having shearing edges cooperating with the undersurface of said plate to shear off hairs projecting therethrough; a rotatable drive shaft; means for coupling said cutter member to the drive shaft for rotation therewith; a coil spring sleeving an end of said drive shaft; and a collar fixed to said shaft upon which said spring is seated, the opposite end of said spring engaging said cutter member and resiliently urging the shearing edge thereof into engagement with the undersurface of said shear plate.

16. A shaving device for personal use comprising a circular head having a face and a depending peripheral flange, said head having an annular series of narrow and closely spaced hair-receiving slots extending through the face and peripheral flange thereof, said slots being short in proportion to the diameter of the head, and the portion of the head circumscribed by said annular series of slots being thicker than the slotted portion; and a rotatable blade having shearing edges in contact with the underside of the slotted portion of the head and cooperating with the interior edges of the walls of the slots to shear off hair extending through said slots.

LOUIS J. NEVRAUMONT.

CERTIFICATE OF CORRECTION.

Reissue No. 21,944. November 11, 1941.

LOUIS J. NEVRAUMONT.

It is hereby certified that error appears in the printed specification of the above numbered patent requiring correction as follows: Page 2, second column, lines 71 and 72, claim 11, for "surfaces cooperating with the underedges" read --edges cooperating with the undersurface--; and that the said Letters Patent should be read with this correction therein that the same may conform to the record of the case in the Patent Office.

Signed and sealed this 3rd day of March, A. D. 1942.

Henry Van Arsdale,
Acting Commissioner of Patents.

(Seal)

tary cutter, said wall having a series of slots merging with the slots of the disc for guiding hair through the same and into the slots of the disc to be sheared off by said shearing edges, said last-named slots extending substantially below said shearing edges to allow long hair to pass therethrough and be sheared off by said edges.

12. In a shaving device having a rotatable inner cutter, an outer shear plate comprising a face-engaging disc having an annular series of narrow and closely spaced hair-receiving slots therethrough; and an annular receding guard flange integral with the disc provided with slots merging with the slots in the disc.

13. In a shaving device, the combination of a flat face engaging apertured shear plate; a rotatable cutter member having shearing edges in contact with the undersurface of said shear plate for shearing off hair extending therethrough; a casing; and flange means carried by and extending outwardly from said shear plate on opposite sides thereof for securing the same to said casing.

14. A shaving implement of the rotary type comprising a casing; a guard member having a substantially flat circular portion with a depending peripheral wall, said flat circular portion having openings forming approximately radial teeth therein, said wall having slots extending at right angles to the plane of said teeth and merging with the openings formed in said flat circular portion; an outwardly extending flange carried by said guard member for attaching the same to said casing; and a cutter having a plurality of blades rotatable in contact with the inner face of the guard.

15. In a shaving device, the combination of a thin, apertured skin-contacting shear plate; a rotatable blade having shearing edges cooperating with the undersurface of said plate to shear off hairs projecting therethrough; a rotatable drive shaft; means for coupling said cutter member to the drive shaft for rotation therewith; a coil spring sleeving an end of said drive shaft; and a collar fixed to said shaft upon which said spring is seated, the opposite end of said spring engaging said cutter member and resiliently urging the shearing edge thereof into engagement with the undersurface of said shear plate.

16. A shaving device for personal use comprising a circular head having a face and a depending peripheral flange, said head having an annular series of narrow and closely spaced hair-receiving slots extending through the face and peripheral flange thereof, said slots being short in proportion to the diameter of the head, and the portion of the head circumscribed by said annular series of slots being thicker than the slotted portion; and a rotatable blade having shearing edges in contact with the underside of the slotted portion of the head and cooperating with the interior edges of the walls of the slots to shear off hair extending through said slots.

LOUIS J. NEVRAUMONT.

CERTIFICATE OF CORRECTION.

Reissue No. 21,944. November 11, 1941.

LOUIS J. NEVRAUMONT.

It is hereby certified that error appears in the printed specification of the above numbered patent requiring correction as follows: Page 2, second column, lines 71 and 72, claim 11, for "surfaces cooperating with the underedges" read --edges cooperating with the undersurface--; and that the said Letters Patent should be read with this correction therein that the same may conform to the record of the case in the Patent Office.

Signed and sealed this 3rd day of March, A. D. 1942.

Henry Van Arsdale,
Acting Commissioner of Patents.

(Seal)